United States Patent [19]
Grant

[11] Patent Number: 5,188,857
[45] Date of Patent: Feb. 23, 1993

[54] CITRUS JUICE CONCENTRATE METHOD

[75] Inventor: Philip M. Grant, Norcross, Ga.

[73] Assignee: APV Gaulin, Inc., Everett, Mass.

[21] Appl. No.: 635,397

[22] Filed: Jan. 2, 1991

Related U.S. Application Data

[63] Continuation of Ser. No. 399,171, Aug. 28, 1989, abandoned, which is a continuation-in-part of Ser. No. 46,346, May 1, 1987, Pat. No. 4,886,574.

[51] Int. Cl.$^5$ .......................... A23L 2/02; B01D 1/26
[52] U.S. Cl. ................................. 426/519; 159/17.1; 159/47.1; 159/DIG. 8; 202/174; 426/599
[58] Field of Search ................... 159/47.1, 17.1, 27.3, 159/DIG. 8, DIG. 40; 202/174, 176; 426/599, 519, 330.5

[56] References Cited

U.S. PATENT DOCUMENTS

| | | | |
|---|---|---|---|
| 2,628,168 | 2/1953 | Madsen | 159/17.1 |
| 2,773,774 | 12/1956 | McCarthy et al. | 159/17.1 |
| 3,118,776 | 1/1964 | Byer et al. | 426/599 |
| 3,141,807 | 7/1964 | Cook | 159/17.1 |
| 3,293,150 | 12/1966 | Cook | 159/17.1 |
| 3,354,932 | 11/1967 | Hessler et al. | 159/17.1 |
| 3,425,477 | 2/1969 | Farin | 159/47.3 |
| 3,469,616 | 9/1969 | Laguilharre | 159/17.1 |
| 3,527,281 | 9/1970 | Hamill | |
| 3,892,877 | 7/1975 | Wagner et al. | 426/599 |

(List continued on next page.)

FOREIGN PATENT DOCUMENTS

| | | | |
|---|---|---|---|
| 2439035 | 5/1980 | France | |
| 1163372 | 9/1969 | United Kingdom | |
| 1474177 | 5/1977 | United Kingdom | 159/17.1 |

OTHER PUBLICATIONS

Zeki Berk, "Viscosity of Orange Juice Concentrates: Effect of Ultrasonic Treatment and Concentration", *Food Technology*, Nov. 1964, pp. 153-154.

Robert J. Braddock, "Pectinase Treatment of Raw Orange Juice and Subsequent Quality Changes in 60° Brix Concentrate", *Proc. Fla. State Hort. Soc.* 94:270-273, 1981.

C. S. Chen, "Citrus Evaporator Technology", *Transactions of the ASAE* vol. 25, No. 5, pp. 1456-1463, 1982.

P. G. Crandall, R. P. Beilock, "The Costs and Benefits of Transporting 72° Brix Orange Concentrate", *Proc. Fla. State Hort. Soc.*, 98:200-206, 1985.

P. G. Crandall, C. S. Chen and T. R. Graumlich, "Energy Savings From Storing a High Degree Brix Orange Juice Concentrate at Elevated Temperatures in an Inert Atmosphere", *Proc. Int. Soc. Citriculture* 855-859, 1981.

P. G. Crandall and T. R. Graumlich, "Storage Stability
(List continued on next page.)

*Primary Examiner*—Virginia Manoharan
*Attorney, Agent, or Firm*—Hamilton, Brook, Smith & Reynolds

[57] ABSTRACT

A citrus juice concentrate processing homogenizes a mixture of citrus juice and pulp within or after a multi-effect, multi-stage evaporator. The homogenizer employs a positive displacement pump for pumping the citrus juice mixture through an orifice with a high pressure differential across the orifice. The homogenizer reduces viscosity of the citrus juice mixture. Inter-stage placement of the homogenizer further enables final citrus juice concentrate Brix levels of 72° Brix and greater to be achieved.

8 Claims, 1 Drawing Sheet

U.S. PATENT DOCUMENTS

| | | | |
|---|---|---|---|
| 3,959,067 | 5/1976 | Cohn | 159/17.1 |
| 3,972,725 | 8/1976 | Nicol | 159/286 |
| 4,016,001 | 4/1977 | Hoks | 159/17.1 |
| 4,232,053 | 11/1980 | Blake | 426/616 |
| 4,253,386 | 3/1981 | Egnell | 426/583 |
| 4,675,194 | 6/1987 | Gaffney | 426/583 |
| 4,687,546 | 8/1987 | Willis | 159/2.1 |
| 4,705,691 | 11/1987 | Kupper et al. | 426/590 |
| 4,818,555 | 4/1989 | Piotrowski et al. | 426/492 |
| 4,886,574 | 12/1989 | Grant | 159/17.1 |
| 4,946,702 | 8/1990 | Stipp et al. | 426/519 |

OTHER PUBLICATIONS and Quality of High Brix Orange Concentrate", *Proc. Fla. State Hort. Soc.* 95:198-201, 1982.

Shimon Mizrahi and Zeki Berk, "Flow Behaviour of Concentrated Orange Juice", *PhD. Thesis of Shimon Mizrahi, Department of Food and Biotechnology, Technion, Israel Institute of Technology, Haifa,* Apr. 9, 1970, pp. 342-355.

P. G. Crandall, C. S. Chen, and K. C. Davis "Preparation and Storage of 72° Brix Orange Juice Concentrate", *Journal of Food Science,* vol. 52(2), 1987, pp. 381-385.

Fruit Juices VIII., "Heat Concentration", by A. G. Martinez, in *Food Science and Technology* Abstract No. 70-09-H1017, vol. 29, No. 339, pp. 563-574; (341) 714-20, 1969.

"Models for Predicting Viscosity of Orange Juice Concentrate" by P. G. Crandall, et al., in *Food Technology,* vol. 36, No. 5, May 1982, pp. 256-252.

CITRUS JUICE CONCENTRATE METHOD

This is a continuation of co-pending application Ser. No. 07/399,171 filed on Aug. 28, 1989, abandoned which is a continuation-in-part of Ser. No. 07/046,346 filed May 1, 1989, now U.S. Pat. No. 4,886,574.

BACKGROUND OF THE INVENTION

Most citrus juice beverages, such as orange juice, are derived from a concentrate. Typically, juice and pulp extracted from various citrus fruits are processed through an evaporator system under vacuum which evaporates liquid (i.e. water) contained in the juice and pulp mixture, and leaves a citrus juice product or concentrate. Liquid is evaporated from the citrus juice concentrate until a 62° to 65° Brix level is achieved where Brix is the unit of percent sugar content of the citrus juice concentrate. The 65° Brix citrus juice concentrate is then stored under required refrigeration at about 20°-27° Fahrenheit to prevent spoilage. There, the citrus juice concentrate congeals and forms a frozen juice concentrate. The frozen concentrate is sold to dispensing businesses who dilute the concentrate to a 12° Brix beverage, package the beverage and distribute the beverage to industries such as restaurants and hospitals for bulk consumption, or to retail stores for individual consumer sale. Or the frozen concentrate is diluted to 42° Brix for commercial sale in frozen form which is subsequently diluted by purchasing consumers to about a 12° Brix juice beverage.

Besides varietal differences, juices differ due to weather (freezing) and other growing conditions. A proper mixture of fruit varieties and maturities must be used to obtain an acceptable color, Brix level and viscosity of the concentrate. While a higher final Brix level is desirable for reducing storage and transportation expenses of the concentrate, a low viscosity level is desirable to decrease difficulty in the pumping of the concentrate through the evaporator system and into and out of storage.

Several complications exist in this process. For example, throughout the evaporation process, the citrus juice concentrate becomes more viscous. Toward the end of the evaporation process, scorching or burn on and product build-up of the concentrate may occur due to reduced and inconsistent flow of the viscous concentrate. Such scorching is highly detectable in the taste of the finished product and requires cleaning of the evaporator. Hence, the achievement of higher Brix levels is limited by the viscosity of the concentrate.

Another problem concerns the storing and transporting of the concentrate. Large capacity freezers and refrigerated trucks at the proper temperature must be used due to the volume of space and temperature required by the juice concentrate.

Several methods of blending different varieties of juice and/or pulp have been used to address the problem of obtaining concentrate of a high Brix level and low viscosity. However, due to unpredictable weather conditions, different varieties and maturities of fruits may be produced from one crop to the next and from one season to the next. Thus, a different method of blending must be devised for each crop.

A centrifuge has been used to remove pulp and thus decrease viscosity of the initial juice and pulp where a change in season, maturity and variety (i.e. different cultivars and early to late season fruit) produces fruit with relatively more pulp. The centrifuge, however, causes the loss of two to three percent of the useable fruit product.

Various enzymes have also been suggested to enhance Brix level while maintaining a suitable viscosity level of the concentrate, but enzymes require the introduction of a foreign material to the juice which is not permitted under Federal Standard of Identity Regulations.

SUMMARY OF THE INVENTION

The present invention discloses a system for forming juice concentrate which reduces the viscosity of the juice concentrate produced by the evaporation of liquid from a supply of juice. The reduction of viscosity of the juice concentrate prior to storage facilitates the handling of the concentrate. Further, the present invention enables the reduction of viscosity in the juice concentrate in an intermediate step within the evaporation process. Such reduction of viscosity aids in the flow of juice concentrate through the evaporation system to prevent scorching of the juice concentrate and build-up of the product with resulting damage to the tube walls, and thus allows a more constant evaporator output of 65° Brix or higher and preferably Brix levels of greater than about 72° Brix to be achieved. Juice concentrate of such higher Brix levels enables storage and shipment at decreased volumes and at temperatures around about 40° F.

A system embodying the present invention comprises an evaporator of several stages and a homogenizer connected to the output of one of the evaporator stages. Liquid (i.e. water) from a supply of juice is evaporated in each stage of the evaporator to form a juice concentrate. After flowing through the stage to which the homogenizer is connected, the juice concentrate is homogenized to form a juice concentrate which is decreased in viscosity. Liquid from the homogenized juice concentrate is evaporated in any remaining stages of the evaporator, and the final juice concentrate is stored under the requisite refrigeration depending on the final Brix level achieved. The closer the homogenizer is to the last stage of the evaporator, the greater may be the decrease in viscosity.

In a preferred embodiment, citrus juice and pulp, such as that from oranges, are processed through a first part of an evaporator, then homogenized, and processed in a second part of the evaporator to achieve an increased Brix level of about 65° Brix or higher and preferably about 72° Brix.

In addition, the citrus juice and pulp may be preheated before being passed through the evaporator.

In accordance with one aspect of the present invention, the homogenizer is preferably a positive displacement plunger pump which pumps juice concentrate through an orifice with a pressure differential across the orifice of at least 500 psi. In a preferred embodiment the orifice is a knife-edge type valve.

In accordance with another aspect of the present invention, a multi-effect, multi-stage evaporator is used to evaporate liquid from the juice concentrate. In a preferred embodiment, the homogenizer is connected just prior to the last effect of a thermally accelerated short time evaporator (TASTE) in which juice concentrate is passed in heat exchange relationship with steam.

BRIEF DESCRIPTION OF THE DRAWING

The foregoing and other objects, features and advantages of the invention will be apparent from the following more particular description of a preferred embodiment of the invention, as illustrated in the accompanying drawing. The drawing is not necessarily to scale, emphasis instead being placed upon illustrating the principles of the invention.

DETAILED DESCRIPTION OF THE PREFERRED EMBODIMENT

Figure 1:
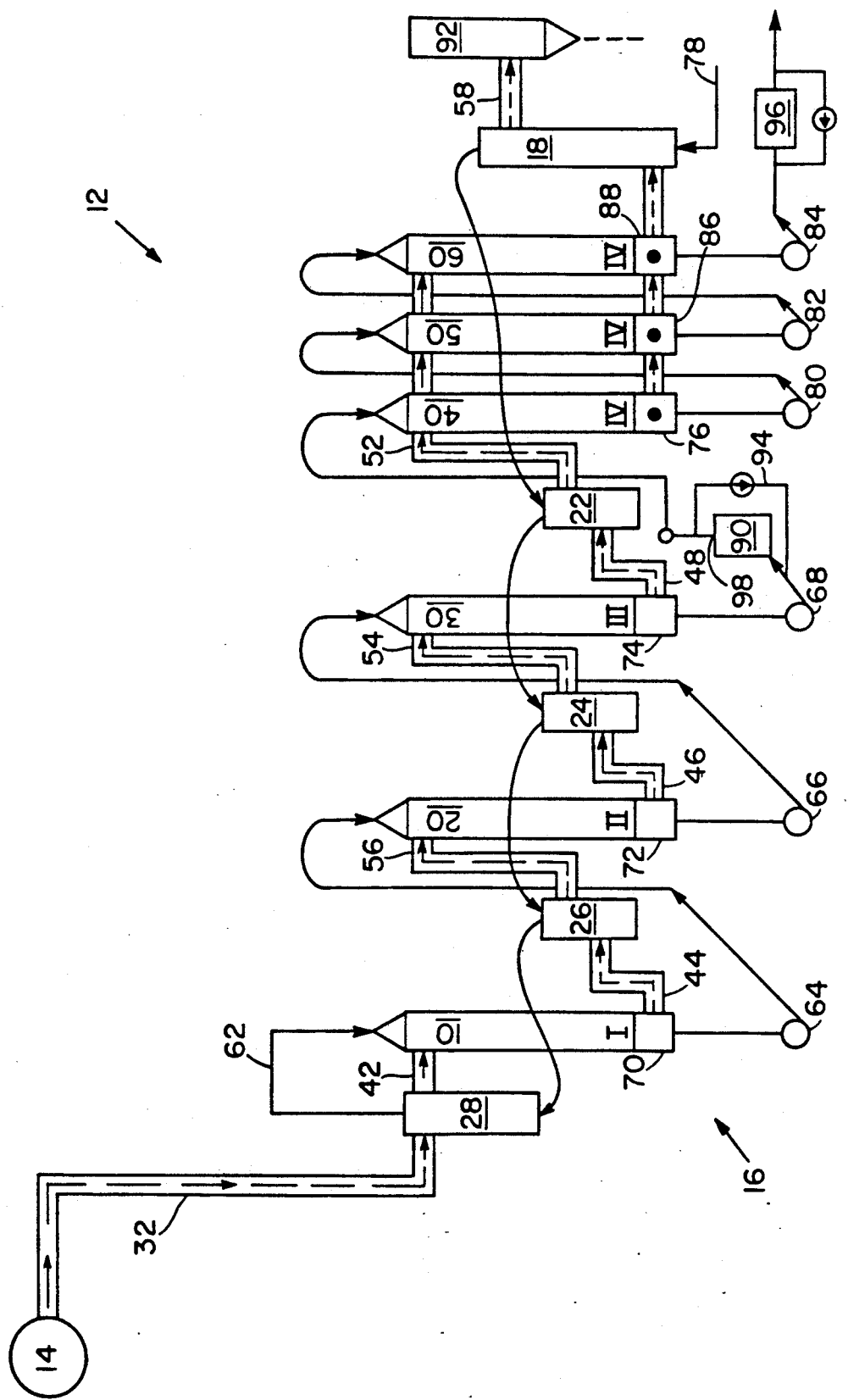
FIG. 1 is a schematic of a preferred embodiment of the present invention.

A schematic diagram of a citrus juice concentrate processor embodying the present invention is provided in FIG. 1. Dashed lines indicate the flow path of steam from a source 14 and solid lines indicate the flow path of the citrus juice mixture being processed. Four "Effects" of the system 12 are defined by the four positions at which steam is introduced to the evaporator 16 and are labeled I, II, III, and IV. Each Effect comprises a stage or stages 10, 20, 30, 40, 50, 60 which serve as heat exchangers, as will be discussed. Evaporator 16 is preferably of the thermally accelerated short time evaporator type.

A mixture of juice and pulp from citrus fruit is introduced to the processor 12 through juice inlet line 78 which enters preheater 18, the first preheater of a series of preheaters. The citrus juice mixture is warmed in preheater 18, passed to succeeding preheaters, 22, 24, 26 which are positioned between the four Effects, one preheater at each intermediate position, and lastly passed to a fifth preheater 28 positioned near the head of Effect I.

Preheater 28 is supplied with steam by steam inlet line 32. Each of the intermediate preheaters 22, 24, 26 receives steam from an outlet of the respective preceding Effect. That is, steam outlet line 44 of Effect I provides steam for preheater 26. Steam outlet line 46 of Effect II provided steam for preheater 24. Steam outlet line 48 of Effect III provides steam for preheater 22. Preheater 18 receives steam outputted from Effect IV and subsequently transfers the steam to cooling water tank 92 through steam outlet line 58. Each preheater uses the respectively provided steam to heat the citrus juice mixture before passing the juice mixture to a succeeding preheater.

The citrus juice mixture is at a final preheated temperature of about 210° F. and at a concentration of about 12° Brix after passing through the last preheater of the series, preheater 28. The preheated citrus juice mixture is then carried to and enters Effect I through line 62. Effect I is supplied with the steam from preheater 28 through steam line 42. In Effect I, the citrus juice mixture is passed in heat exchange relation with the steam. This is accomplished with tubular stage 10, which comprises inner cylinders coaxially positioned within an outer cylinder. The citrus juice mixture is passed along the inner cylinders at the same time steam is passed through the outer cylinder. Water in the citrus juice mixture is evaporated off, leaving a relatively more viscous citrus juice mixture.

A vapor separator 70 at the bottom of the coaxial cylinders separates the water vapor from the citrus juice mixture. The water vapor mixed with the steam is transferred through steam outlet line 44 of vapor separator 70 to preheater 26 as previously mentioned. Transfer pump 64 pumps the citrus juice mixture from vapor separator 70 to the head of tubular stage 20 of Effect II. At this point, the citrus juice mixture is about 18° Brix at about 180° to about 190° F.

Water from the citrus juice mixture is evaporated in tubular stage 20 of Effect II in the same manner as in tubular stage 10 of Effect I, but with preheater 26 supplying the steam to tubular stage 20 through steam line 56. Vapor separator 72 at the bottom of tubular stage 20 separates the newly evaporated water vapor from the citrus juice mixture further increasing viscosity of the mixture. The vapor is transferred through steam outlet line 46 to preheater 24 and transfer pump 66 pumps the increased viscosity citrus juice mixture to the head of tubular stage 30 of Effect III. The citrus juice mixture enters stage 30 at about a 28° Brix concentration at about 140° F.

Preheater 24 supplies steam to tubular stage 30 through steam line 54. Water from the citrus juice mixture is further evaporated in tubular stage 30. The collected vapor and viscous citrus juice mixture are separated in vapor separator 74 at the bottom end of stage 30. The water vapor is transferred through steam outlet line 48 to pre-heater 22 and subsequently to tubular stages 40, 50, 60 of Effect IV through steam line 52. Transfer pump 68 pumps the three-stage processed viscous citrus juice mixture into homogenizer 90.

Homogenizer 90 includes a positive displacement plunger pump which produces a constant output flow independent of operating pressure. Homogenizer 90 pumps the citrus juice mixture through an orifice 98 with a high pressure differential across the orifice 98 of about 500 psi and greater. It is preferred that the pressure differential across the orifice 98 be about 2300 psi to about 5000 psi. For example, an orifice of a knife edge type valve is suitable.

Further, homogenizer 90 is set to match the flow rate of evaporator 16. This is accomplished by homogenizer 90 having an output flow rate set equal to the maximum incoming flow rate from evaporator 16, and by having a feedback bypass 94 which compensates for the lack of input flow during minimum incoming flow from evaporator 16.

The homogenized citrus juice mixture is at a concentration of about 40° Brix and at a temperature of about 115° F. Homogenizer 90 pumps the homogenized citrus juice mixture into tubular stage 40, the first of three tubular stages in Effect IV (the remaining part of the multiple-effect, multiple-stage evaporator 16). Evaporation of water from the citrus juice mixture takes place in each of the three tubular stages 40, 50, 60 of Effect IV in the same manner as in the previous tubular stages. The citrus juice mixture becomes more viscous after each stage. Tubular stages 40, 50, 60 share the steam inputted to Effect IV through steam line 52 from preheater 22. Each of the tubular stages 40, 50, 60 is respectively connected to a vapor separator 76, 86, 88. Vapor separator 76 passes collected water vapor to stage 50 and passes the processed citrus juice mixture to transfer pump 80, which transfers the mixture to the head of tubular stage 50. Vapor separator 86 at the bottom end of tubular stage 50 passes collected vapor to stage 60 and passes the processed citrus juice mixture to transfer pump 82 which transfers the juice mixture to the head of tubular stage 60. Vapor separator 88, at the bottom end of tubular stage 60 passes collected vapor to preheater 18 and passes the processed citrus juice mixture to transfer pump 84 which pumps the citrus juice mixture out of the system in concentrate form at about 65° Brix to about 75° Brix.

Because tubular stages 40, 50 and 60 share in succession the same working steam, tubular stages 50 operates at a cooler temperature than stage 40 and tubular stage 60 operates at a cooler stage than stage 50. Hence, the citrus juice mixture is cooled at each of the tubular stages 40 50 and 60. The output temperature of the citrus juice concentrate is about 60° F.

The intereffect arrangement of preheaters 18, 22, 24, 26 and 28 allows for increased utilization of energy. However, preheater 28 could have been used alone with juice inlet line 78 leading directly to preheater 28 and with vapor separator 88 of the last stage 60 directly passing vapor to cooling water tank 92.

It is understood that the evaporator 16 of the present invention may be one of various designs of multiple effect, multiple stage evaporator systems with and without intereffect preheaters, or with interstage preheaters plus a condensate recovery scheme as discussed in "Citrus Evaporator Technology" by C. S. Chen in *Transactions*, Vol. 25, no. 5, pp 1457-1463, 1982, and herein incorporated by reference.

It is also understood that one or more homogenizers 90 can be positioned after any transfer pump to decrease viscosity of the citrus juice mixture, which in turn provides a more uniformly flowing citrus juice mixture within the system. Such uniform flow is typically most desirable in the last Effect IV where the citrus juice mixture typically becomes so viscous that scorching and build-up may occur. In some cases, the closer the homogenizer is positioned to the last tubular stage 60, the greater is the reduction in viscosity of the citrus juice mixture. Thus, the viscosity of the citrus product decreases in an amount defined as a function of position of the homogenizer with respect to the evaporator.

Furthermore, intereffect or interstage homogenization reduces viscosity such that further evaporation may be possible which enables a higher percent sugar content (Brix level) to be achieved. At Brix levels at or above 72° Brix, bacteria which causes spoilage are inactive. The intereffect homogenization of the embodiment of FIG. 1 may allow for production of a citrus juice concentrate with about a 75° Brix concentration level which can be stored at freezing temperatures of about 40° F.

In a system where scorching is not a problem and a homogenizer 96 is positioned after the last transfer pump 84, a reduction in viscosity is also achieved. This is most important when producing a product of 72° Brix or higher. However, a Brix level above 65° is not necessarily achieved because the viscosity in the final effect is too high to allow sufficient evaporation. Hence, an optimum position of the homogenizer is between the last two Effects, Effects III and IV, after transfer pump 68, where both high reduction in viscosity and increase in Brix level is obtained. Depending on the tendency to scorch within Effect IV and the accessibility of pumps 80 and 82, other potential optimum positions of the homogenizer are between stages 40 and 50 or between stages 50 and 60.

It is further noted that homogenizers 90 and 96 reduce the viscosity of the citrus juice mixture with no product loss in contrast to a centrifuge which typically causes the loss of 2% to 3% of the juice product.

The citrus juice mixture referred to throughout this discussion is meant to include, but not to be limited to, juice from citrus fruits such as oranges, grapefruits, lemons and limes; and also other fruits such as pineapples, passion fruit, guava, and papaya, to name a few. The present invention processes these juices with or without pulp. Other juices may be similarly processed by the present invention to form a high Brix level juice concentrate.

Further benefits of the present invention include the following. The evaporator 16 operates much more smoothly when at least homogenizer 90 is connected to it. This is noticeable in all the stages 40, 50, 60 after the homogenizer 90. Operators can better control the output of the evaporator 16 without continuous adjustments being required to steam and flow of infeed juice.

Further the homogenizers 90, 96 completely and consistently eliminate defects in the finished concentrate. Defects are formed from flakes of Hesperidin which, having accumulated on the sides of the tube bundles of the stages, start to break off and show up in the end concentrate product. The homogenizers 90, 96 break these flakes into particles of a size which makes them no longer noticeable in the finished product. This is important for two reasons. First, the concentrate designated to be sold on the futures market has to obtain a specific score on several predesignated criteria such as color, Brix, taste, acid, defects, etc. The optimal score for the defects criteria is 20. If defects are noticed, a score of only 19 or 18 may be achieved and the lost points will have to be recouped with extra color or other characteristics, each of which will cost. Hence by eliminating defects, the present invention saves cost in the processing of juice concentrate for the futures market. The second reason why homogenizer breakage of flakes (defects) is important relates to down time for cleaning the evaporator to prevent defects from initially occurring. With the homogenizers 90, 96 of the present invention able to eliminate defects by substantially reducing the size of flakes, the evaporator 16 can be allowed to run significantly longer between cleaning shutdowns. Lost production and energy costs required to bring the evaporator 16 back up to full operation are thus avoided.

Another major benefit of the present invention is the reduction of bottom pulp by 1-1½%. This is translated to increased yield of the same amount.

Because the present invention enables viscosity of the concentrate to be reduced in processing, an increase in Brix level to 72°-75° is also enabled. It is noted that the concentrate product tends to gel at such high Brix levels, but the Applicant has overcome the gelling by using shear on the concentrate product as it leaves the evaporator 16. Once shear has been applied, the gel formations do not form and the concentrate product remains as a pumpable liquid in storage.

Shear is applied to the concentrate by a shearing device coupled to the end of evaporator 16. The shearing device may be a homogenizer, beater, or positive displacement pump. One such pump is a low energy, shearing pump known as a lobe pump. It is noted that a homogenizer tends to provide more shear than necessary.

Additional benefits of note include a reduction or elimination of the use of centrifuges to reduce viscosity of the infeed juice. Generally, such centrifuges lose or decrease yield. Also, there is a reduction of dependence on juice from certain varieties which are blended with concentrate product as a means of reducing viscosity. In addition, the increased concentration obtained with the present invention allows the use of a 5 to 1 dispenser pack instead of a 4 to 1 dispenser pack. This saves in shipping and storage costs.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A method of processing citrus juice concentrate in an interrelated homogenization and evaporation steps, the steps comprising:
   providing citrus juice which decreases in viscosity with homogenization and has a tendency to gel at brix levels of about 72° to about 75°;
   in an evaporator, evaporating the citrus juice preheated to a final temperature of about 210° F. in a multistage, multieffect evaporator to form a viscous citrus product; and
   decreasing viscosity of the citrus product in an amount defined as a function of position of a homogenizer with respect to the evaporator, said decreasing viscosity including homogenizing the viscous citrus product at one of an intermediate position and output end of the multistage, multieffect evaporator, said homogenizing at one of an intermediate position and output end of the evaporator further aiding flow throughout the evaporator by providing uniform flow of the citrus product throughout the evaporator.

2. A method as claimed in claim 1 wherein the step of evaporating citrus juice includes passing the citrus juice in heat exchange with a heat source to evaporate liquid from the citrus juice and form a citrus juice concentrate.

3. A method as claimed in claim 1 wherein the step of evaporating citrus juice includes passing the citrus juice through a thermally accelerated short time evaporator.

4. A method as claimed in claim 1 wherein the step of homogenizing the viscous citrus product includes pumping the citrus product through an orifice with a pressure differential across the orifice of at least 500 psi.

5. A method as claimed in claim 1 wherein the step of homogenizing includes reducing defects in the citrus product.

6. A method as claimed in claim 1 wherein the step of homogenizing includes reducing bottom pulp in the citrus product.

7. A method of increasing the Brix level of citrus juice concentrate in an interrelated homogenization and evaporation steps, the steps comprising:
   providing citrus juice which decreases in viscosity with homogenization and has a tendency to gel at Brix levels of about 72° to about 75°;
   in an evaporator:
      (a) evaporating liquid from citrus juice preheated to a final temperature of about 210° F. in a multistage, multieffect evaporator to form a citrus juice concentrate;
      (b) positioning a homogenizer between last two effects of the evaporator;
      (c) reducing viscosity of the citrus juice concentrate by homogenizing the citrus juice concentrate in said homogenizer; and
      (d) further evaporating liquid from the homogenized citrus juice concentrate, wherein the step of evaporating liquid from citrus juice includes passing the citrus juice through a first part of a multiple-effect multiple-stage evaporator, and the step of further evaporating liquid includes passing the citrus juice concentrate through a remaining part of said multiple-effect multiple-stage evaporator, said steps of evaporating and further evaporating providing an evaporation process within which the step of homogenizing is performed to aid flow throughout the evaporation process.

8. A method as claimed in claim 7 wherein the step of further evaporating includes providing a citrus juice concentrate increased in concentration such that a subsequent 5 to 1 dispensing is enabled.

* * * * *